United States Patent
Irie

(10) Patent No.: US 6,683,713 B2
(45) Date of Patent: *Jan. 27, 2004

(54) METHOD, DEVICE, AND SYSTEM FOR LEVEL EQUALIZATION

(75) Inventor: Hiroyuki Irie, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/564,551

(22) Filed: May 4, 2000

(65) Prior Publication Data

US 2003/0048525 A1 Mar. 13, 2003

(30) Foreign Application Priority Data

Aug. 18, 1999 (JP) .......................... 11-231703

(51) Int. Cl.$^7$ ................................ H01S 3/00
(52) U.S. Cl. ................................ 359/341.41
(58) Field of Search ............... 372/6; 359/194, 359/337, 337.1, 337.11, 337.12, 337.13, 337.2, 337.21, 337.22, 337.3, 337.4, 337.5, 341.1, 341.2, 341.3, 341.31, 341.32, 341.33, 341.4, 341.41, 341.42, 341.43, 341.44, 341.5

(56) References Cited

U.S. PATENT DOCUMENTS

| | | | |
|---|---|---|---|
| 5,721,635 A | * 2/1998 | Shigematsu et al. | ........ 359/341 |
| 5,818,629 A | * 10/1998 | Kinoshita | .................. 359/341 |
| 6,049,413 A | * 4/2000 | Taylor et al. | ................. 359/337 |
| 6,055,092 A | * 4/2000 | Sugaya et al. | ............... 359/337 |
| 6,204,958 B1 | * 3/2001 | Taylor et al. | ................. 359/337 |
| 6,219,176 B1 | * 4/2001 | Terahara | ...................... 359/341 |
| 6,347,008 B1 | * 2/2002 | Vodhanel | ................... 359/337.4 |
| 6,377,394 B1 | * 4/2002 | Drake et al. | .............. 359/337.4 |

FOREIGN PATENT DOCUMENTS

| | | | |
|---|---|---|---|
| JP | 6-169122 | 6/1994 | ............. H01S/3/10 |
| JP | 6-302921 | 10/1994 | ............. H01S/3/23 |
| JP | 7-147445 | 6/1995 | ............. H01S/3/10 |

OTHER PUBLICATIONS

Park et al., "Doped fibre length and pump power of gain flattened EDFAs", Electronics Letters, Nov. 7th, 1996, Vo. 32, No. 23, pp. 2161–2162.*

* cited by examiner

Primary Examiner—Thomas G. Black
Assistant Examiner—Deandra M. Hughes
(74) Attorney, Agent, or Firm—Staas & Halsey LLP

(57) ABSTRACT

Disclosed herein is a method for level equalization. In this method, a first optical amplifier having a gain tilt coefficient defined as a change in gain tilt to a unit change in gain is first provided. A second optical amplifier having a gain tilt coefficient different from the gain tilt coefficient of the first optical amplifier is cascaded to the first optical amplifier. The gains of the first and second optical amplifiers are distributed so that a level tilt of light amplified by the first and second optical amplifiers becomes substantially flat. Thus, it is possible to provide a simple method for allowing automatic level equalization by providing a plurality of optical amplifiers having different gain tilt coefficients and distributing the gains of these optical amplifiers so that a level tilt of light amplified by these optical amplifiers becomes substantially flat.

24 Claims, 10 Drawing Sheets

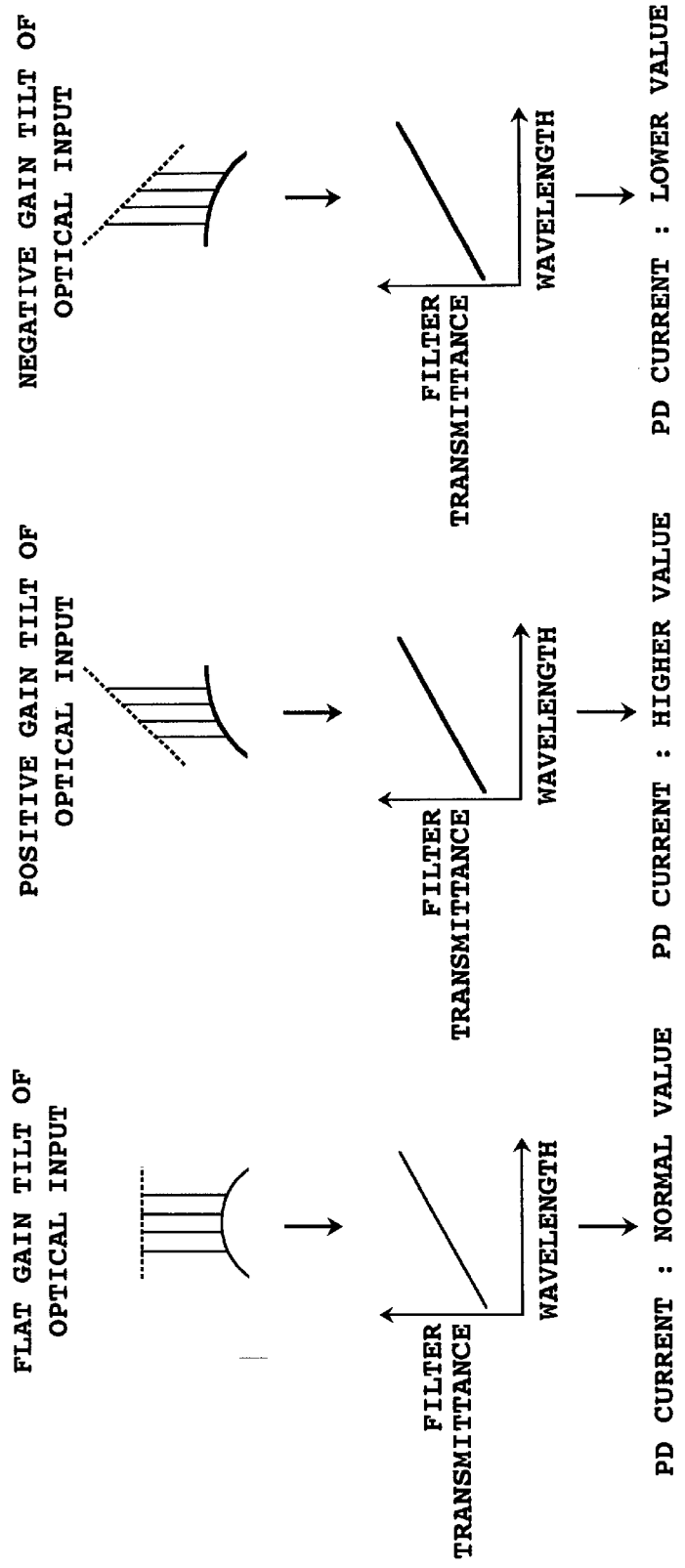

LEVEL
FLAT LEVEL TILT OF OPTICAL INPUT

→WAVELENGTH

NORMAL GAIN : 5dB

GAIN

→WAVELENGTH

NORMAL GAIN : 5dB

GAIN

→WAVELENGTH

LEVEL TILT OF
OPTICAL INPUT : +2dB

GAIN : 10dB ; TILT : -2.5dB

GAIN : 0dB ; TILT : +0.5dB

LEVEL TILT OF
OPTICAL INPUT : -1dB

GAIN : 2.5dB ; TILT : +1.25dB

GAIN : 7.5dB ; TILT : -0.25dB

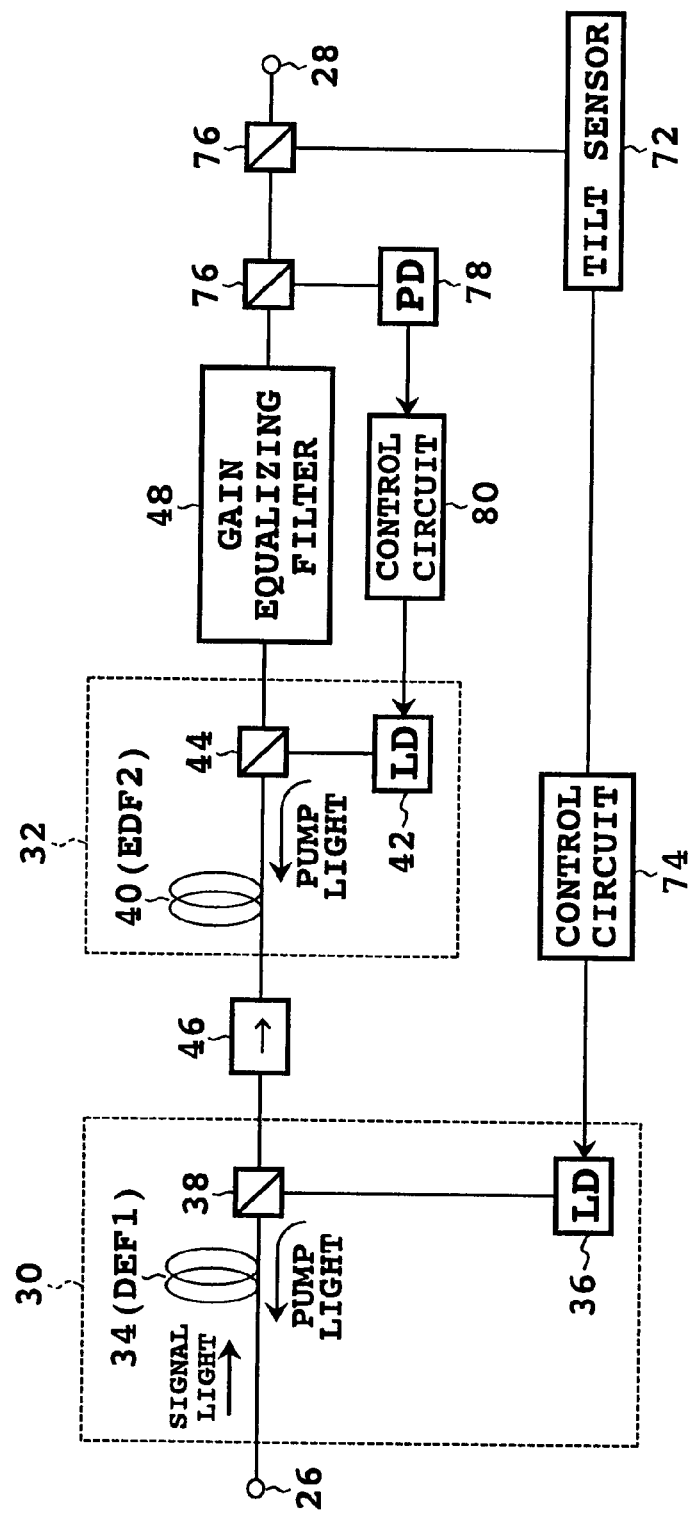

METHOD, DEVICE, AND SYSTEM FOR LEVEL EQUALIZATION

BACKGROUND OF THE INVENTION

1. Field of the Invention

The present invention relates to a method suitable for wavelength division multiplexing, and more particularly to a method, device, and system for level equalization.

2. Description of the Related Art

In recent years, a manufacturing technique and using technique for a low-loss (e.g., 0.2 dB/km) silica optical fiber have been established, and an optical communication system using the optical fiber as a transmission line has been put to practical use. Further, to compensate for losses in the optical fiber and thereby allow long-haul transmission, an optical amplifier for amplifying an optical signal or signal light has been put to practical use.

An optical amplifier known in the art includes an optical amplifying medium to which signal light to be amplified is supplied and a pumping unit for pumping (exciting) the optical amplifying medium so that the optical amplifying medium provides a gain band including the wavelength of the signal light.

For example, an erbium doped fiber amplifier (EDFA) has been developed to amplify signal light having a wavelength band of 1.55 μm where the loss in a silica fiber is minimum. The EDFA includes an erbium doped fiber (EDF) as the optical amplifying medium and a pumping source for supplying pump light having a predetermined wavelength to the EDF. By preliminarily setting the wavelength of the pump light within a 0.98 μm band or a 1.48 μm band, a gain band including a wavelength band of 1.55 μm can be obtained.

Further, another type optical amplifier having a semiconductor chip as the optical amplifying medium is also known. In this case, the pumping is performed by injecting an electric current into the semiconductor chip.

As a technique for increasing a transmission capacity by a single optical fiber, wavelength division multiplexing (WDM) is known. In a system adopting WDM, a plurality of optical carriers having different wavelengths are used. The plural optical carriers are individually modulated to thereby obtain a plurality of optical signals, which are wavelength division multiplexed by an optical multiplexer to obtain main signal light (WDM signal light), which is output to an optical fiber transmission line. At a receiving end, the main signal light received is separated into individual optical signals by an optical demultiplexer, and transmitted data (a main signal) is reproduced according to each optical signal. Accordingly, by applying WDM, the transmission capacity by a single optical fiber can be increased according to the number of WDM channels.

In the case of incorporating an optical amplifier into a system adopting WDM, a transmission distance is limited by the wavelength characteristic of gain of the optical amplifier which characteristic is represented by a gain deviation or gain tilt. For example, in a typical EDFA, it is known that a gain deviation is produced at wavelengths near 1.55 μm. If the gain deviations in a plurality of cascaded EDFAs are accumulated, an optical SNR (signal-to-noise ratio) in a channel included in a low-gain band is degraded. Accordingly, to allow high-quality transmission, it is preferable to flatten the wavelength characteristic of gain of an optical amplifier.

A long-haul repeatered transmission system including an optical fiber transmission line for transmitting WDM signal light and a plurality of optical repeaters arranged along the optical fiber transmission line is in practical use. Each optical repeater includes an EDFA for compensating for loss of the optical fiber transmission line. Further, a gain equalizing filter is adopted to equalize the wavelength characteristic of gain of the EDFA. However, it is difficult from the viewpoint of fabrication technique to make the wavelength characteristic of gain of the EDFA precisely coincide with the wavelength characteristic of loss of the gain equalizing filter, causing an equalization residual deviation. In the case of multirepeatered transmission, the equalization residual deviation is accumulated to incur an unneglible interchannel level deviation, causing a degradation in transmission quality. This is a principal factor that limits a transmittable distance and a transmittable wavelength band.

On the other hand, there is a possibility that the transmission line loss may change during operation of a system because of aged deterioration of the optical fiber transmission line or repair against a breakage accident of the optical fiber transmission line. To cope with this, each optical repeater performs output maintaining control such that an output level is maintained constant. For example, this control is such that the output level is monitored and the power of pump light to be supplied to the EDFA is controlled according to the result of this monitoring. However, when the power of the pump light for the EDFA is changed for the output maintaining control, the gain of the EDFA changes to result in a change in wavelength characteristic of gain. If this change in wavelength characteristic of gain is accumulated over the length of the transmission line, the transmittable distance and the transmittable wavelength band are limited as similar to the above.

For relaxation of these limits, it is necessary to repair the interchannel level deviation at suitable intervals in the transmission line and thereby reduce the interchannel level deviation at a receiving end. For example, a system in practical use employs a method such that a gain equalizing filter for compensating for the accumulation of an equalization residual deviation is inserted in the transmission line at every tens of repeaters. In this method, however, the wavelength characteristics of gain of tens of repeaters are measured at a site where an optical repeater and an optical fiber each provided as a product are connected, and a suitable one is selected from a plurality of gain equalizing filters according to the result of this measuring. Thus, this method is very complex to perform.

SUMMARY OF THE INVENTION

It is therefore an object of the present invention to provide a simple method, device, and system for allowing automatic level equalization. Other objects of the present invention will become apparent from the following description.

In accordance with a first aspect of the present invention, there is provided a method for level equalization. First, a first optical amplifier having a gain tilt coefficient defined as a change in gain tilt to a unit change in gain is provided. Second, a second optical amplifier having a gain tilt coefficient different from the gain tilt coefficient of the first optical amplifier is cascaded to the first optical amplifier. Then, the gains of the first and second optical amplifiers are distributed so that a level tilt of light amplified by the first and second optical amplifiers becomes substantially flat.

Thus, it is possible to provide a simple method for allowing automatic level equalization by providing a plurality of optical amplifiers having different gain tilt coefficients and distributing the gains of these optical amplifiers so that a level tilt of light amplified by these optical amplifiers becomes substantially flat.

In accordance with a second aspect of the present invention, there is provided a device comprising first and second optical amplifiers and a control unit. The first optical amplifier has a gain tilt coefficient defined as a change in gain tilt to a unit change in gain. The second optical amplifier is cascaded to the first optical amplifier and has a gain tilt coefficient different from the gain tilt coefficient of the first optical amplifier. The control unit distributes the gains of the first and second optical amplifiers so that a level tilt of light amplified by the first and second optical amplifiers becomes substantially flat.

Thus, it is possible to provide a simple device for allowing automatic level equalization by cascading a plurality of optical amplifiers having different gain tilt coefficients and distributing the gains of these optical amplifiers so that a level tilt of light amplified by these optical amplifiers becomes flat.

In accordance with a third aspect of the present invention, there is provided a system comprising an optical fiber transmission line for transmitting WDM signal light obtained by wavelength division multiplexing a plurality of optical signals having different wavelengths, and a plurality of optical repeaters arranged along the optical fiber transmission line. At least one of the plurality of optical repeaters includes the device according to the present invention.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIGS. 6A, 6B, and 6C are diagrams for illustrating the principle of operation of a tilt monitor shown in FIG. 5;

FIG. 11 is a block diagram showing another preferred embodiment of the optical repeater to which the present invention is applied.

DETAILED DESCRIPTION OF THE PREFERRED EMBODIMENTS

Figure 1:
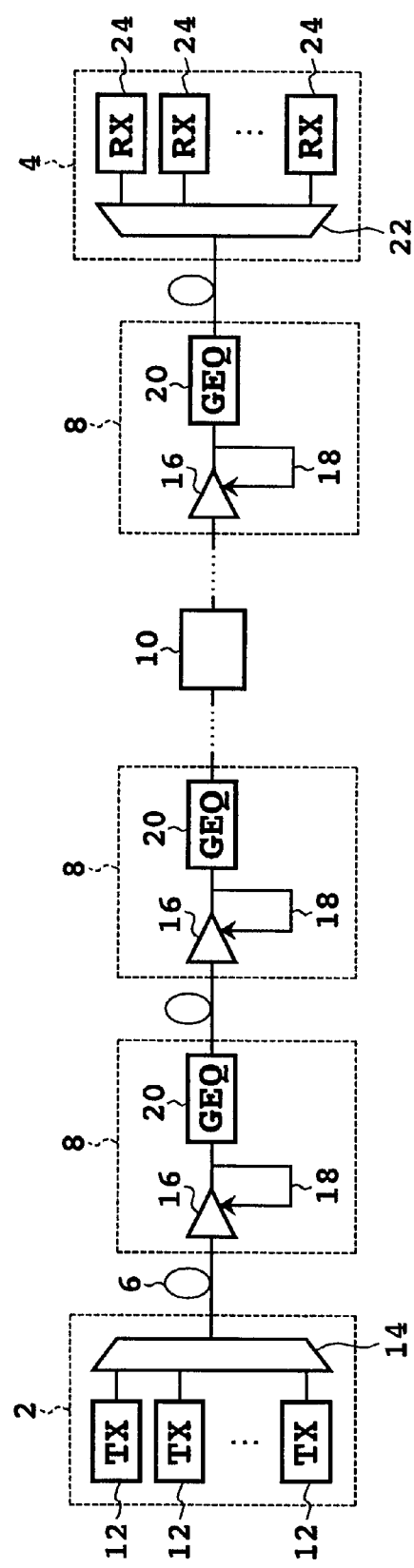
FIG. 1 is a block diagram showing a preferred embodiment of the system according to the present invention.

Some preferred embodiments of the present invention will now be described in detail with reference to the attached drawings. The same reference numerals in similar drawings denote like or similar parts.

FIG. 1 is a block diagram showing a preferred embodiment of the system according to the present invention. This system includes a first terminal device 2 as a transmitting end, a second terminal device 4 as a receiving end, an optical fiber transmission line 6 placed between the terminal devices 2 and 4, and a plurality of optical repeaters arranged along the optical fiber transmission line 6. The plurality of optical repeaters include a plurality of optical repeaters 8 to which the prior art is applied and at least one optical repeater 10 to which the present invention is applied.

The first terminal device 2 includes a plurality of optical transmitters (TX) 12 for outputting optical signals having different wavelengths and an optical multiplexer 14 for wavelength division multiplexing the optical signals output from the optical transmitters 12 and launching resultant WDM signal light into the optical fiber transmission line 6.

Each optical repeater 8 includes an optical amplifier 16 for amplifying the WDM signal light transmitted by the optical fiber transmission line 6, a feedback loop 18 for feedback controlling the optical amplifier 16 so that an output level from the optical amplifier 16 or the optical repeater 8 is maintained constant, and a gain equalizer (GEQ) 20 having a wavelength characteristic of loss compensating for the wavelength characteristic of gain of the optical amplifier 16. The configuration and operation of the optical repeater 10 to which the present invention is applied will be hereinafter described.

The second terminal device 4 includes an optical demultiplexer 22 for separating the WDM signal light transmitted by the optical fiber transmission line 6 into individual optical signals and a plurality of optical receivers (RX) 24 for receiving the optical signals output from the optical demultiplexer 22.

Figure 2A:
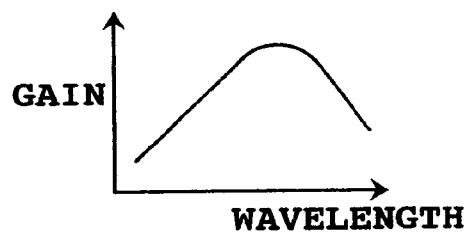
FIGS. 2A, 2B, and 2C are graphs for illustrating the operation of a gain equalizer in an optical repeater shown in FIG. 1.
Figure 2B:
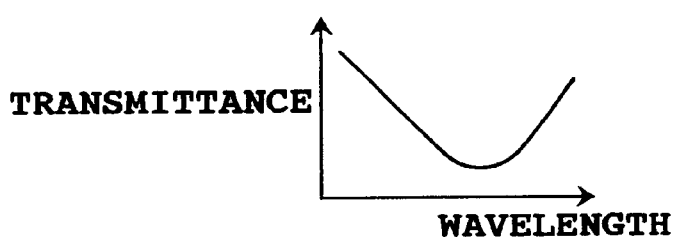
Figure 2C:
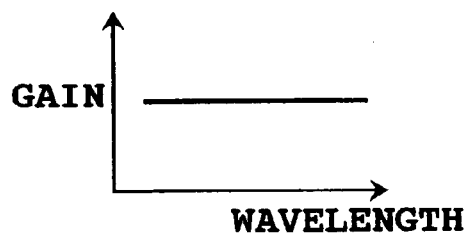

The operation of the gain equalizer 20 in each optical repeater 8 shown in FIG. 1 will now be described with reference to FIGS. 2A, 2B, and 2C. FIG. 2A is a graph showing the wavelength characteristic of gain of the optical amplifier 16, FIG. 2B is a graph showing the wavelength characteristic of loss (transmittance) of the gain equalizer 20, and FIG. 2C is a graph showing a wavelength characteristic of gain in the optical repeater 8 as a whole. In the case that the optical amplifier 16 has a wavelength characteristic of gain as shown in FIG. 2A, the gain equalizer 20 having a characteristic substantially opposite to the characteristic shown in FIG. 2A is used as shown in FIG. 2B, thereby making the wavelength characteristic of gain of the optical repeater 8 substantially flat as shown in FIG. 2C.

Figure 3:
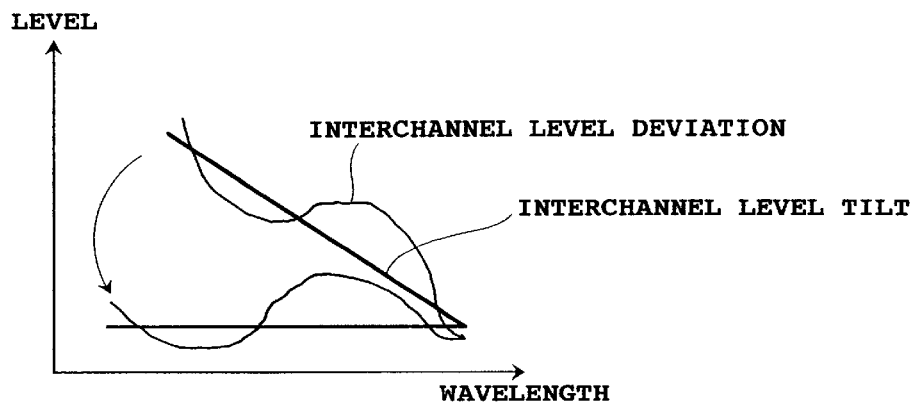
FIG. 3 is a graph for illustrating a level deviation and a level tilt.

FIG. 3 is a graph for illustrating a level deviation and a level tilt between channels of WDM signal light. In the system shown in FIG. 1, each optical repeater 8 employs the gain equalizer 20, so that the wavelength characteristic of gain in each optical repeater 8 is made substantially flat as described above with reference to FIGS. 2A to 2C. However, providing a gain equalizer 20 having a wavelength characteristic of loss precisely compensating for the wavelength characteristic of gain of the optical amplifier 16 is difficult from the viewpoint of fabrication technique. As a result, the use of the plural optical repeaters 8 causes accumulation of equalization residual error, incurring an interchannel level deviation. As shown in FIG. 3, this interchannel level deviation forms a curve with respect to wavelength, and it can be linearly approximated to a level tilt with respect to wavelength. Accordingly, by making the level tilt substantially flat, the interchannel level deviation can be greatly improved.

Figure 4:
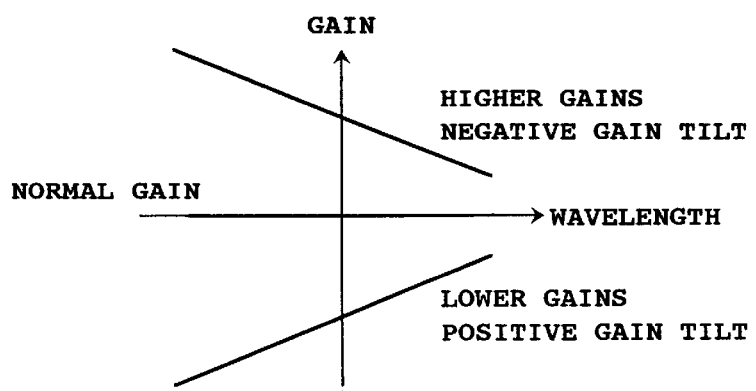
FIG. 4 is a graph for illustrating changes in gain tilt of an EDFA (erbium doped fiber amplifier) according to gain.

FIG. 4 is a graph for illustrating changes in gain tilt of an EDFA according to gain. Changes in wavelength characteristic of gain of an EDFA with changes in gain appear as changes in gain tilt with respect to wavelength. In the case that a gain equalizing filter is used, the gain tilt is flat for a normal gain, and becomes downward to the right with respect to wavelength when increasing the gain, whereas becomes upward to the right with respect to wavelength when decreasing the gain. The condition where the gain is higher at longer wavelengths is defined as a positive gain tilt, whereas the condition where the gain is lower at longer wavelengths is defined as a negative gain tilt. Accordingly, when the gain is increased as compared with the normal gain, the gain tilt is negative, whereas when the gain is decreased as compared with the normal gain, the gain tilt is positive. A change in gain tilt to a unit change in gain (tilt [dB/nm]/gain [dB]) is defined as a gain tilt coefficient [dB/dB/nm]. The gain tilt coefficient can be set by adjusting the length of an EDF or the doping concentration of Er.

The object of the present invention can be achieved by combining a plurality of optical amplifiers having different gain tilt coefficients to configure the optical repeater 10 shown in FIG. 1. This will now be described more specifically.

Figure 5:
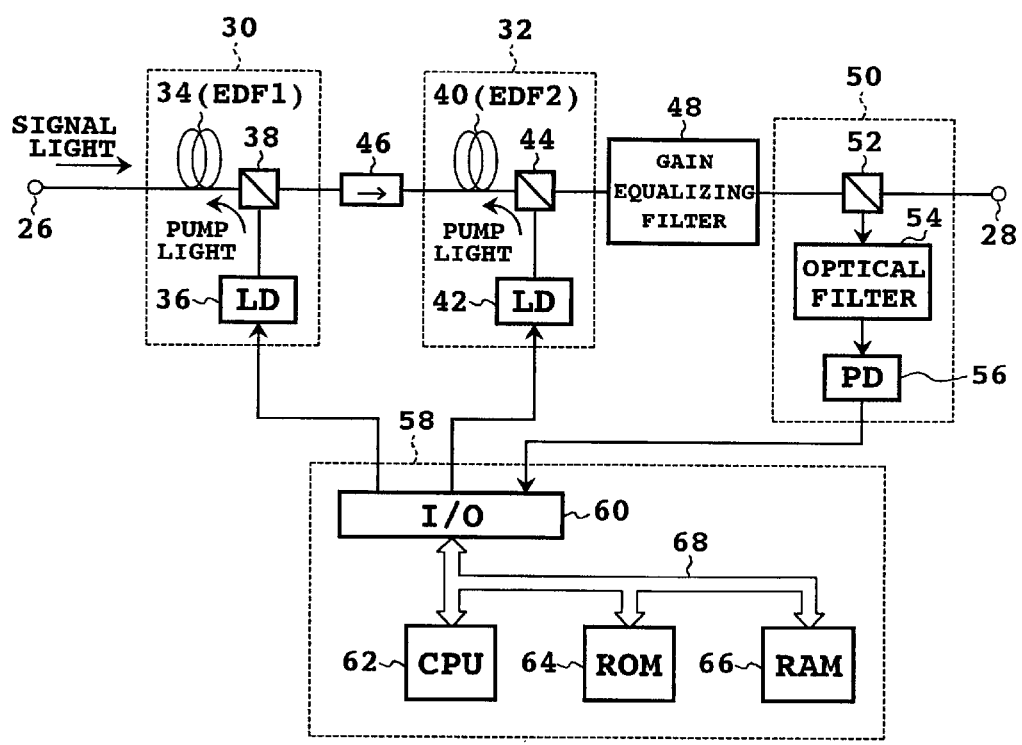
FIG. 5 is a block diagram showing a preferred embodiment of the optical repeater to which the present invention is applied.
Figure 7A:
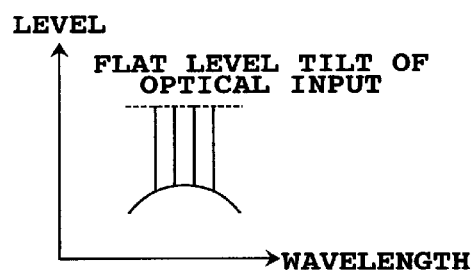
FIGS. 7A, 7B, 7C, and 7D are diagrams showing an example of the operation of the optical repeater shown in FIG. 5.
Figure 7B:
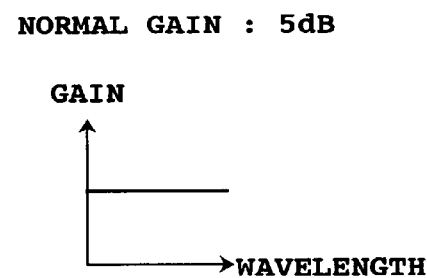
Figure 7C:
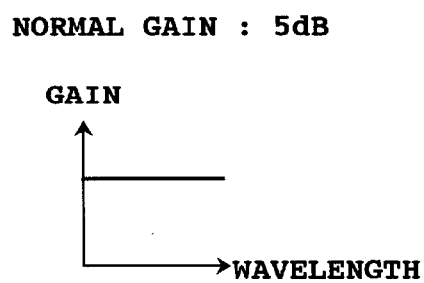
Figure 7D:
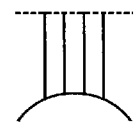
Figure 8A:
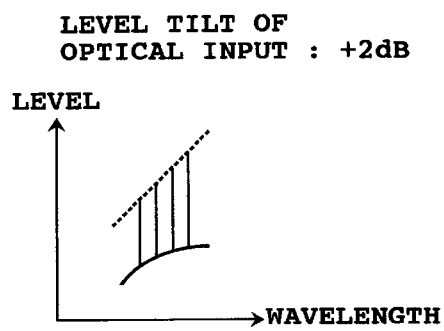
FIGS. 8A, 8B, 8C, and 8D are diagrams showing another example of the operation of the optical repeater shown in FIG. 5.
Figure 8B:
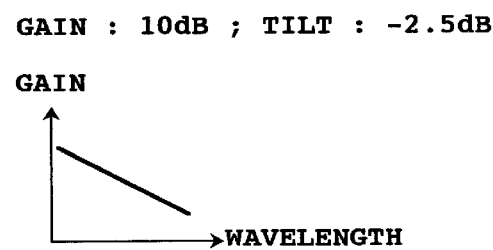
Figure 8C:
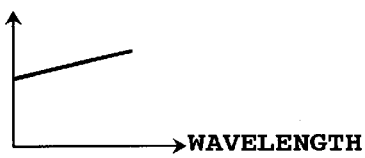
Figure 8D:
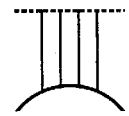
Figure 9A:
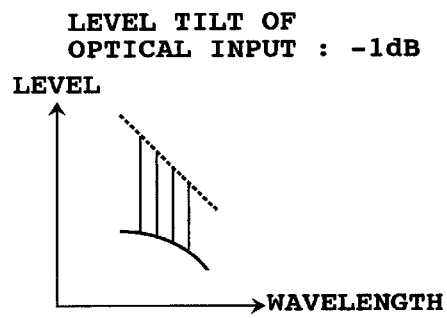
FIGS. 9A, 9B, 9C, and 9D are diagrams showing still another example of the operation of the optical repeater shown in FIG. 5.
Figure 9B:
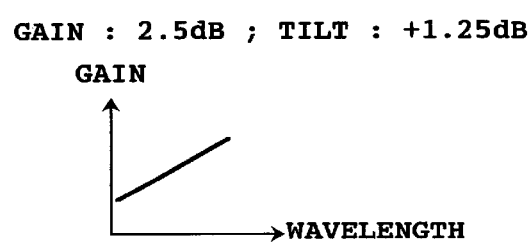
Figure 9C:
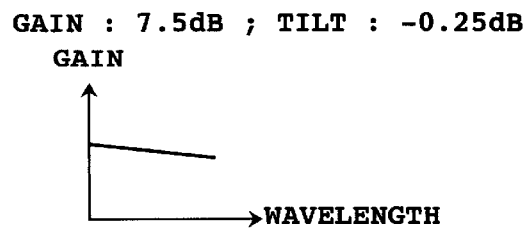
Figure 9D:
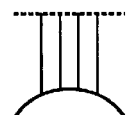

FIG. 5 is a block diagram showing a preferred embodiment of the optical repeater to which the present invention is applied. The optical repeater to which the present invention is applied can be used as the optical repeater 10 shown in FIG. 1.

The optical repeater shown in FIG. 5 has an input port 26 for receiving WDM signal light, an output port 28 for outputting amplified WDM signal light, and a first optical amplifier 30 and a second optical amplifier 32 cascaded between the input port 26 and the output port 28.

The first optical amplifier 30 includes an erbium doped fiber 34 (which will be hereinafter referred to also as an "EDF1") as an optical amplifying medium, and a laser diode (LD) or LD module 36 as a pumping source for supplying pump light to the doped fiber 34. The first optical amplifier 30 further includes a WDM coupler 38 provided downstream of the doped fiber 34 in respect of a propagation direction of WDM signal light. The pump light output from the laser diode 36 is supplied through the WDM coupler 38 to the doped fiber 34.

The second optical amplifier 32 includes an erbium doped fiber 40 (which will be hereinafter referred to also as an "EDF2") as an optical amplifying medium, and a laser diode or LD module 42 as a pumping source for supplying pump light to the doped fiber 40.

The second optical amplifier 32 further includes a WDM coupler 44 provided downstream of the doped fiber 40 in respect of a propagation direction of WDM signal light. The pump light output from the laser diode 42 is supplied through the WDM coupler 44 to the doped fiber 40.

An optical isolator 46 is connected between the optical amplifiers 30 and 32 to make it possible to independently control the optical amplifiers 30 and 32 and to prevent undesirable oscillation in each of the optical amplifiers 30 and 32. Accordingly, the WDM signal light input to the input port 26 is amplified by the first optical amplifier 30, passed through the optical isolator 46 in the forward direction, and supplied to the second optical amplifier 32. The WDM signal light further amplified by the second optical amplifier 32 is passed through a gain equalizing filter 48 and a tilt monitor 50 to reach the output port 28. The gain equalizing filter 48 functions to gain equalize at least one of the optical amplifiers 30 and 32 so as to cancel a level deviation of the light amplified by the optical amplifiers 30 and 32. The tilt monitor 50 functions to detect a level tilt of the light amplified by the optical amplifiers 30 and 32.

The tilt monitor 50 includes a beam splitter 52 for branching off a monitor beam from the light amplified by the optical amplifiers 30 and 32, an optical filter 54 to which the monitor beam is supplied, and a photodetector 56 to which light passed through the optical filter 54 is supplied. The optical filter 54 is used for weighting, and its transmittance increases or decreases according to wavelength in a given band. FIGS. 6A to 6C illustrate the principle of operation of the tilt monitor 50 shown in FIG. 5. It is assumed that the optical filter 54 has a characteristic such that its transmittance linearly increases with an increase in wavelength. In the case that light having a flat gain tilt is input as shown in FIG. 6A, a photocurrent (PD current) flowing in the photodetector 56 has a normal value. In the case that light having a positive gain tilt is input as shown in FIG. 6B, the PD current has a value higher than the normal value. In the case that light having a negative gain tilt is input as shown in FIG. 6C, the PD current has a value lower than the normal value.

In this manner, the level tilt of optical input and the PD current are in 1:1 correspondence in the tilt monitor 50 employing the optical filter 54 and the photodetector 56, so that the level tilt can be detected with a simple configuration.

A control unit is provided to distribute the gains of the optical amplifiers 30 and 32 so that the level tilt of light amplified by the optical amplifiers 30 and 32 becomes substantially flat. In this preferred embodiment, the control unit includes the tilt monitor 50 and a controller 58. The controller 58 includes an I/O port 60 for inputting an output signal from the tilt monitor 50 after analog/digital conversion of the output signal and outputting a control signal for deciding the power of pump light to be output from each of the laser diodes 36 and 42 after digital/analog conversion of the control signal, a CPU (central processing unit) 62 for performing a computation according to a predetermined rule on gain distribution or the like, a ROM (read-only memory) 64 previously storing a program, data, etc. required for the computation, a RAM (random access memory) 66 for temporarily storing the results of the computation, etc., and a data bus 68 for mutually connecting the I/O port 60, the CPU 62, the ROM 64, and the RAM 66.

The operation of the controller 58 in the optical repeater shown in FIG. 5 will now be described by using actual numerical examples. The initial conditions are such that the gain in the optical repeater as a whole is preset to 10 dB (constant value), the wavelength bandwidth is present to 10 nm, and the normal gain and the gain tilt coefficient of each of the EDF1 and the EDF2 are preset as shown in Table 1. Further, it is assumed that the wavelength characteristics of gain of the EDF1 and the EDF2 are smoothened by the gain equalizing filter. The gain tilt coefficient shows a gain tilt in the wavelength bandwidth of 10 nm.

TABLE 1

|  | EDF1 | EDF2 |
| --- | --- | --- |
| Normal Gain | 5 dB | 5 dB |
| Gain Tilt Coefficient | 0.5 dB/dB/10 nm | 0.1 dB/dB/10 nm |

FIGS. 7A to 7D and Table 2 show an example of the operation of the optical repeater shown in FIG. 5. In this example, the input signal light has a flat level tilt.

TABLE 2

| | Input Signal | EDF1 | EDF2 | Repeater | Output |
|---|---|---|---|---|---|
| Gain | | 5 dB | 5 dB | 10 dB | |
| Tilt | 0 dB/10 nm | 0 dB/ 10 nm | 0 dB/ 10 nm | 0 dB/ 10 nm | 0 dB/ 10 nm |

FIGS. 8A to 8D and Table 3 show another example of the operation of the optical repeater shown in FIG. 5. In this example, the input signal light has a level tilt of +2 dB. The gain of the EDF1 is set higher than the normal gain, and the gain of the EDF2 is set lower than the normal gain, thereby obtaining a characteristic such that the gain tilt in the optical repeater as a whole is reverse in sign to the level tilt of the input signal light. As a result, the level tilt of the output signal light can be made substantially flat.

TABLE 3

| | Input Signal | EDF1 | EDF2 | Repeater | Output |
|---|---|---|---|---|---|
| Gain | | 10 dB | 0 dB | 10 dB | |
| Tilt | +2 dB/ 10 nm | −2.5 dB/ 10 nm | +0.5 dB/ 10 nm | −2 dB/ 10 nm | 0 dB/ 10 nm |

FIGS. 9A to 9D and Table 4 show still another example of the operation of the optical repeater shown in FIG. 5. In this example, the input signal light has a level tilt of −1 dB. The gain of the EDF1 is set lower than the normal gain, and the gain of the EDF2 is set higher than the normal gain, thereby obtaining a characteristic such that the gain tilt in the optical repeater as a whole is reverse in sign to the level tilt of the input signal light. As a result, the level tilt of the output signal light can be made substantially flat.

TABLE 4

| | Input Signal | EDF1 | EDF2 | Repeater | Output |
|---|---|---|---|---|---|
| Gain | | 2.5 dB | 7.5 dB | 10 dB | |
| Tilt | −1 dB/ 10 nm | +1.25 dB/ 10 nm | −0.25 dB/ 10 nm | +1 dB/ 10 nm | 0 dB/ 10 nm |

Letting G1 and G2 denote the gain of the EDF1 and the gain of the EDF2, respectively, the following simultaneous equations are given under the conditions shown in Table 1.

$$G1+G2=10$$

$$-1\times(\text{level tilt of optical input})=0.5\times(G1-5)+0.1\times(G2-5)$$

Figure 10:
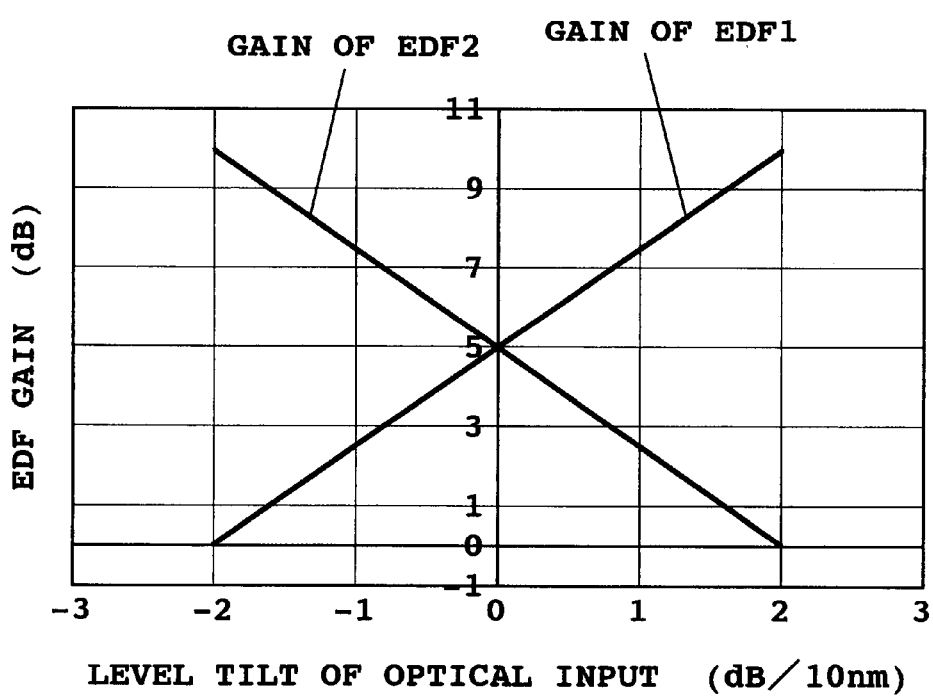
FIG. 10 is a graph showing a distribution of the gains of an EDF1 and an EDF2.

Referring to FIG. 10, there is shown a distribution of the gains of the EDF1 and the EDF2 according to the level tilt of optical input. The graph shown in FIG. 10 is given by the solution of the simultaneous equations mentioned above. In this manner, by cascading the EDF1 and the EDF2 having different gain tilt coefficients to thereby set a gain distribution to be determined uniquely according to the level tilt of optical input given, the level tilt of optical output can be made substantially flat.

For example, in the optical repeater shown in FIG. 5, the controller 58 can feedback control the power of pump light to be output from each of the laser diodes 36 and 42 so that the level tilt detected by the tilt monitor 50 becomes substantially flat. Alternatively, the tilt monitor 50 may be provided on the input side to perform feedforward control such that the above-mentioned simultaneous equations are solved by the CPU 62 to set the power of pump light to be output from each of the laser diodes 36 and 42 so that the gains of the EDF1 and the EDF2 are properly distributed.

FIG. 11 is a block diagram showing another preferred embodiment of the optical repeater to which the present invention is applied. This preferred embodiment is similar to the preferred embodiment shown in FIG. 5 in the point that the first optical amplifier 30, the optical isolator 46, the second optical amplifier 32, and the gain equalizing filter 48 are cascaded between the input port 26 and the output port 28. The preferred embodiment shown in FIG. 11 employs a first feedback loop for controlling the gain of the optical amplifier 30 so that the level tilt of light amplified by the optical amplifiers 30 and 32 becomes substantially flat, and a second feedback loop for controlling the gain of the optical amplifier 32 so that the output level from the optical amplifier 32 becomes substantially constant.

The first feedback loop includes a beam splitter 70 and a tilt sensor 72 each for detecting the level tilt of light amplified by the optical amplifiers 30 and 32, and a control circuit 74 for adjusting the power of pump light to be output from the laser diode 36 so that the level tilt detected above becomes substantially flat.

The second feedback loop includes a beam splitter 76 and a photodetector 78 each for detecting the output level from the optical amplifier 32, and a control circuit 80 for adjusting the power of pump light to be output from the laser diode 42.

The beam splitter 70 and the tilt sensor 72 may be configured like the tilt monitor 50 shown in FIG. 5.

Also according to this preferred embodiment, the level tilt of optical output can be made substantially flat irrespective of the level tilt of optical input in accordance with the above-mentioned principle.

Preferably, the time constant of the first feedback loop is set larger than the time constant of the second feedback loop. In this case, when signal light having a level tilt is input, the output level is first controlled to a constant value by the second feedback loop, and the level tilt is next compensated. Accordingly, the level tilt can be made substantially flat in the condition where the output level is always constant.

In this preferred embodiment, the EDF1 and the EDF2 are used as an optical amplifying medium. Accordingly, by setting the wavelength of pump light to a 0.98-μm band (0.96 to 1.00 μm) or a 1.48-μm band (1.46 to 1.50 μm), a gain band including 1.55 μm can be obtained.

In each preferred embodiment mentioned above, the WDM couplers 38 and 44 are provided downstream of the EDF1 and the EDF2, respectively. Accordingly, WDM signal light and pump light propagate in opposite directions in each of the EDF1 and the EDF2 (backward pumping). Alternatively, the WDM couplers 38 and 44 may be provided upstream of the EDF1 and the EDF2, respectively, to make WDM signal light and pump light propagate in the same direction in each of the EDF1 and the EDF2 (forward pumping). Further, the forward pumping and the backward pumping may be combined to perform bidirectional pumping. However, to make it possible to independently control the pump lights in the optical amplifiers 30 and 32 by using the optical isolator 46, the backward pumping is suitably adopted.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method for level equalization, comprising:
    providing a first optical amplifier having a gain tilt coefficient defined as a change in gain tilt to a unit change in gain;

cascading said first optical amplifier and a second optical amplifier having a gain tilt coefficient different from the gain tilt coefficient of said first optical amplifier; and distributing the gain tilt coefficients of said first and second optical amplifiers so that a level tilt of light amplified by said first and second optical amplifiers becomes substantially flat.

2. A method according to claim 1, wherein said distributing further comprises setting the sum of the gains of said first and second optical amplifiers to a constant value.

3. A method according to claim 1, wherein distributing further comprises:

controlling the gain of said first optical amplifier so that the level tilt of the light amplified by said first and second optical amplifiers becomes substantially flat; and controlling the gain of said second optical amplifier so that an output level from said second optical amplifier becomes substantially constant.

4. A method according to claim 1, further comprising equalizing at least one of said first and second optical amplifiers so as to cancel a level deviation of the light amplified by said first and second optical amplifiers.

5. A method according to claim 1, wherein:

each of said first and second optical amplifiers, comprises an optical amplifying medium and a pumping source supplying pump light to said optical amplifying medium; and said distributing further comprises adjusting the power of said pump light to be supplied to each optical amplifying medium.

6. A method according to claim 5, wherein:

said optical amplifying medium comprises an erbium doped fiber;

said pump light has a wavelength included in a 0.98-$\mu$m band or a 1.48-$\mu$m band; and each of said first and second optical amplifiers provides a gain band including 1.55 $\mu$m.

7. A device comprising:

a first optical amplifier having a gain tilt coefficient defined as a change in gain tilt to a unit change in gain;

a second optical amplifier cascaded to said first optical amplifier and having a gain tilt coefficient different from the gain tilt coefficient of said first optical amplifier; and a control unit for distributing the gain tilt coefficients of said first and second optical amplifiers so that a level tilt of light amplified by said first and second optical amplifiers becomes substantially flat.

8. A device according to claim 7, wherein:

each of said first and second optical amplifiers comprises an optical amplifying medium and a pumping source for supplying pump light to said optical amplifying medium;

said control unit adjusting the power of said pump light to be supplied to each optical amplifying medium.

9. A device according to claim 8, wherein:

said optical amplifying medium comprises an erbium doped fiber;

said pump light has a wavelength included in a 0.98-$\mu$m band or a 1.48-$\mu$m band; and each of said first and second optical amplifiers provides a gain band including 1.55 $\mu$m.

10. A device according to claim 7, wherein said control unit comprises a tilt monitor for detecting the level tilt of the light amplified by said first and second optical amplifiers.

11. A device according to claim 10, wherein said tilt monitor comprises a beam splitter for branching off a monitor beam from the light amplified by said first and second optical amplifiers, an optical filter to which said monitor beam is supplied, and a photodetector to which light passed through said optical filter is supplied.

12. A device according to claim 7, wherein said control unit comprises a first feedback loop for controlling the gain of said first optical amplifier so that the level tilt of the light amplified by said first and second optical amplifiers becomes substantially flat, and a second feedback loop for controlling the gain of said second optical amplifier so that an output level from said second optical amplifier becomes substantially constant.

13. A device according to claim 12, wherein the time constant of said first feedback loop is larger than the time constant of said second feedback loop.

14. A device according to claim 7, further comprising a gain equalizer for gain equalizing at least one of said first and second optical amplifiers so as to cancel a level deviation of the light amplified by said first and second optical amplifiers.

15. A device according to claim 7, further comprising an optical isolator connected between said first and second optical amplifiers.

16. A system comprising:

an optical fiber transmission line for transmitting signal light obtained by wavelength division, multiplexing a plurality of optical signals having different wavelengths; and a plurality of optical repeaters arranged along said optical fiber transmission line;

at least one of said plurality of optical repeaters comprising:

a first optical amplifier having a gain tilt coefficient defined as a change in gain tilt to a unit change in gain;

a second optical amplifier cascaded to said first optical amplifier and having a gain tilt coefficient different from the gain tilt coefficient of said first optical amplifier; and a control unit for distributing the gain tilt coefficients of said first and second optical amplifiers so that a level tilt of light amplified by said first and second optical amplifiers becomes substantially flat.

17. A fiber optic transmission system, comprising:

a first amplifier that amplifies a light with a first slope defining an amount of amplification for a series of frequencies of light; and a second amplifier that amplifies the light with a second slope defining an amount of amplification for a series of frequencies of light, wherein the first slope and the second slope are balanced so that a slope of tilt amplification becomes flat when the first slope and the second slope are added.

18. The fiber optic transmission system according to claim 17, wherein the light is at least one of a laser light, a fiber optic message and a wavelength division multiplexed fiber optic message.

19. An apparatus, comprising:

a first optical amplifier having a gain tilt coefficient defined as a change in gain tilt to a unit change in gain; and a second optical amplifier connected to the first optical amplifier and having a gain tilt coefficient different from the gain tilt coefficient of said first optical amplifier;

wherein the gain tilt coefficients of said first and second optical amplifiers are distributed so that a level tilt of light amplified by said first and second optical amplifiers becomes substantially flat.

20. An apparatus according to claim 19, further comprising a filter equalizing the gain of the first optical amplifier and the second optical amplifier.

21. An apparatus, comprising:

a first optical amplifier having a gain tilt coefficient;

a second optical amplifier connected to the first optical amplifier and having a gain tilt coefficient different from the gain tilt coefficient of said first optical amplifier; and a controller controlling the gain tilt coefficients of first optical amplifier in accordance with output power of the second optical amplifier.

22. An apparatus according to claim 21, further comprising a filter equalizing the gain of the first optical amplifier and the second optical amplifier.

23. A method to perform level equalization, comprising:

providing a first optical amplifier and a second optical amplifier each having a gain with a corresponding gain tilt coefficient defined as a change in gain tilt to a unit change in gain; and adjusting the gain of the first and second optical amplifiers in accordance with the gain tilt coefficients so that a gain tilt of light amplified by the first and second optical amplifiers becomes substantially flat.

24. A device comprising:

a first optical amplifier having a gain tilt coefficient defined as a change in gain tilt to a unit change in gain;

a second optical amplifier cascaded with the first optical amplifier and having a gain tilt coefficient different from the gain tilt coefficient of the first optical amplifier; and a control unit to adjust the gain of the first and second optical amplifiers in accordance with the gain tilt coefficients thereof so that a gain tilt of light amplified by the first and second optical amplifiers becomes substantially flat.

* * * * *